United States Patent [19]

Rathbun

[11] 4,034,348
[45] July 5, 1977

[54] APPARATUS, INCLUDING DELAY MEANS, FOR SAMPLING AND RECOVERING DATA RECORDED BY THE DOUBLE TRANSITION RECORDING TECHNIQUE

[75] Inventor: Donald J. Rathbun, Andover, Mass.

[73] Assignee: Honeywell Information Systems, Inc., Waltham, Mass.

[22] Filed: June 28, 1976

[21] Appl. No.: 700,276

[52] U.S. Cl. .............................. 364/200; 307/232; 328/63; 328/109
[51] Int. Cl.² ...................... G06F 7/28; H03K 5/00
[58] Field of Search ............... 340/172.5; 307/208, 307/232; 328/63, 109, 120

[56] References Cited

UNITED STATES PATENTS

| | | | |
|---|---|---|---|
| 3,422,425 | 1/1969 | Vallee | 328/63 X |
| 3,518,555 | 6/1970 | Konotchick, Jr. | 328/109 X |
| 3,602,828 | 8/1971 | Kurzweil, Jr. et al. | 307/232 X |
| 3,646,451 | 2/1972 | Shoap | 328/120 X |
| 3,663,883 | 5/1972 | Olso | 328/63 X |
| 3,684,967 | 8/1972 | Kelly | 328/63 |
| 3,740,655 | 6/1973 | Dickey, Jr. | 328/109 X |
| 3,761,887 | 9/1973 | Foster et al. | 340/172.5 |
| 3,792,361 | 2/1974 | Sordello et al. | 328/63 |
| 3,927,259 | 12/1975 | Brown | 307/232 X |

*Primary Examiner*—Melvin B. Chapnick
*Attorney, Agent, or Firm*—John S. Solakian; Ronald T. Reiling; Nicholas Prasinos

[57] ABSTRACT

Data and clock bits are sampled by use of two delay means such as shift registers which are enabled at a clock rate which is set so that a first such delay means coupled to receive the bits includes no more than one bit therein at any time. The receipt of a bit substantially at the midway point of the second delay means, which is coupled serially to receive bits from the first delay means, causes a sampling signal to be generated in response to which a determination is made as to whether another bit has been received by the first delay means. Further logic is provided to recover the data bits.

19 Claims, 7 Drawing Figures

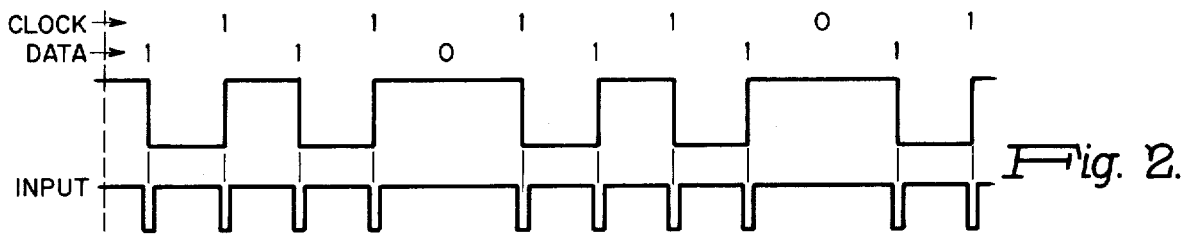
Fig. 1.
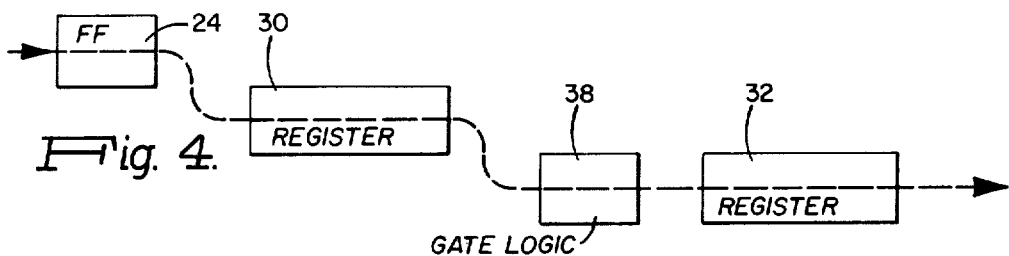
Fig. 2.
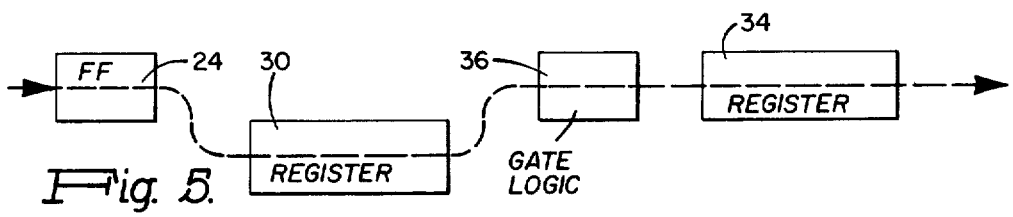
Fig. 4.
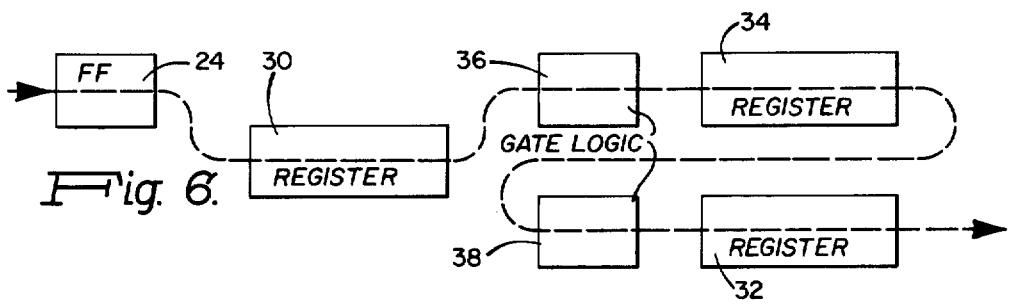
Fig. 5.
Fig. 6.
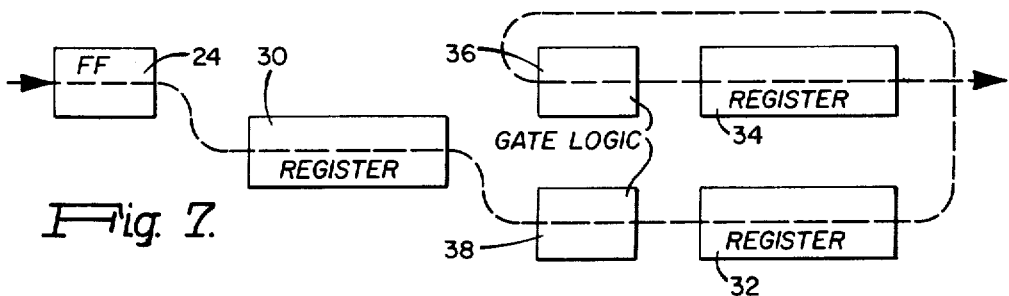
Fig. 7.

APPARATUS, INCLUDING DELAY MEANS, FOR SAMPLING AND RECOVERING DATA RECORDED BY THE DOUBLE TRANSITION RECORDING TECHNIQUE

BACKGROUND OF THE INVENTION

The present invention relates generally to magnetic recording and more particularly to apparatus utilized for the recovery of data which is recorded by the double transition recording technique.

Numerous techniques have been developed for representing and recording binary information on a magnetic medium. This factor is particularly true as data processing speeds have increased and the need for higher density magnetic recording has correspondingly increased. One of such techniques is generally referred to as double transition recording which includes phase encoding and double frequency encoding. In double frequency encoding, clock bits and data bits alternate in a stream of information bits. The presence of a data bit is representative of a first binary number whereas the absence of a data bit is representative of a second binary number. The clock bits are usually present. In phase encoding, the polarity of each recorded transition is representative of the bits stored in a given data cell, an additional transition being required between each pair of like bits. The absence of a clock bit is stored in a given data cell, an additional transition being required between each pair of like bits. The absence of a clock bit is indicative of a change in the binary number of the succeeding data bits.

To facilitate read out of the clock and data bits it is desirable to achieve maximum separation between bits, that is, one half of a period. The period includes both a clock cell at the beginning thereof and a data cell. However, in such high density recording systems severe shifting of the recorded clock and data bits occurs due to magnetic crowding, mechanical jitter, and effects produced by the electric circuits in the process of recording and sensing the data. This shifting of the recorded bits displaces the clock and data bits in their nominal positions in the stream of information bits and can result in erroneous decoding, that is, can result in erroneous generation of the data or clock bits or in the failure to respond to a data bit.

Numerous apparatus exists in the prior art for detecting information which is recorded by the double transition technique. One such prior art device utilizes a circuit for generating a constant phase reference signal synchronized at the same frequency as the signal waveform representing the data. The data and reference signals are combined to produce a signal for sampling the significant transitions over the entire nominal bit period. Another such prior art device utilizes a scheme in which a fixed time period is established for a sampling for the presence of a significant transition, wherein a ramp generator may be utilized to determine the time period. Another known prior technique utilizes a frequency tracking phase lock oscillator during read out. Continually synchronized by the read out pulses this so called fly wheel oscillator is used as a timing reference in lieu of the read out pulses themselves which are subject to instantaneous timing fluctuations. Another technique is shown in U.S. Pat. No. 3,652,943 which includes a delay device in the apparatus thereof for primarily detecting the absence of information in a stream of bits.

It is accordingly the primary object of the present invention to provide improved apparatus for sampling data bits in a stream of information bits which have been recorded by the double transition recording technique, and which apparatus utilizes digital techniques to provide such sampling functions.

SUMMARY OF THE INVENTION

The purposes and objects of the present invention are satisfied by providing apparatus for sampling data from an information stream of clock and data bits wherein the information stream has a first frequency. Such apparatus includes first and second delay elements each having an input and an output wherein the output of the first element is coupled to the input of the second element and wherein the input of the first element is coupled to receive the stream of such bits. Apparatus is included for generating a stream of system clock pulses having a frequency which is N times the first frequency and further apparatus which is responsive to such system clock pulses for enabling the clock and data bits of the information stream to be passed through either of the first or second elements at any given time. Further apparatus is included for indicating that one of the pulses is substantially midway in its passing through the second element and in response thereto further apparatus is provided for sampling where another one of the bits has been received by the first element. Further apparatus is provided in the present invention for separating the data and clock bits so as to present the data content for use in a data processing system or the like.

BRIEF DESCRIPTION OF THE DRAWINGS

The above and other objects of the present invention are achieved in an illustrative embodiment as described with respect to the figures in which:

FIG. 1 illustrates a typical stream of data bits and clock bits to be recovered by the apparatus of the present invention;

FIG. 2 illustrates a representative waveform of the stream to be recovered;

FIGS. 4 through 7 illustrate the flow of clock bits or data bits through various elements of the apparatus of the present invention in response to various combinations of bits in the stream of bits.

DETAILED DESCRIPTION OF THE PREFERRED EMBODIMENT

Figure 3:
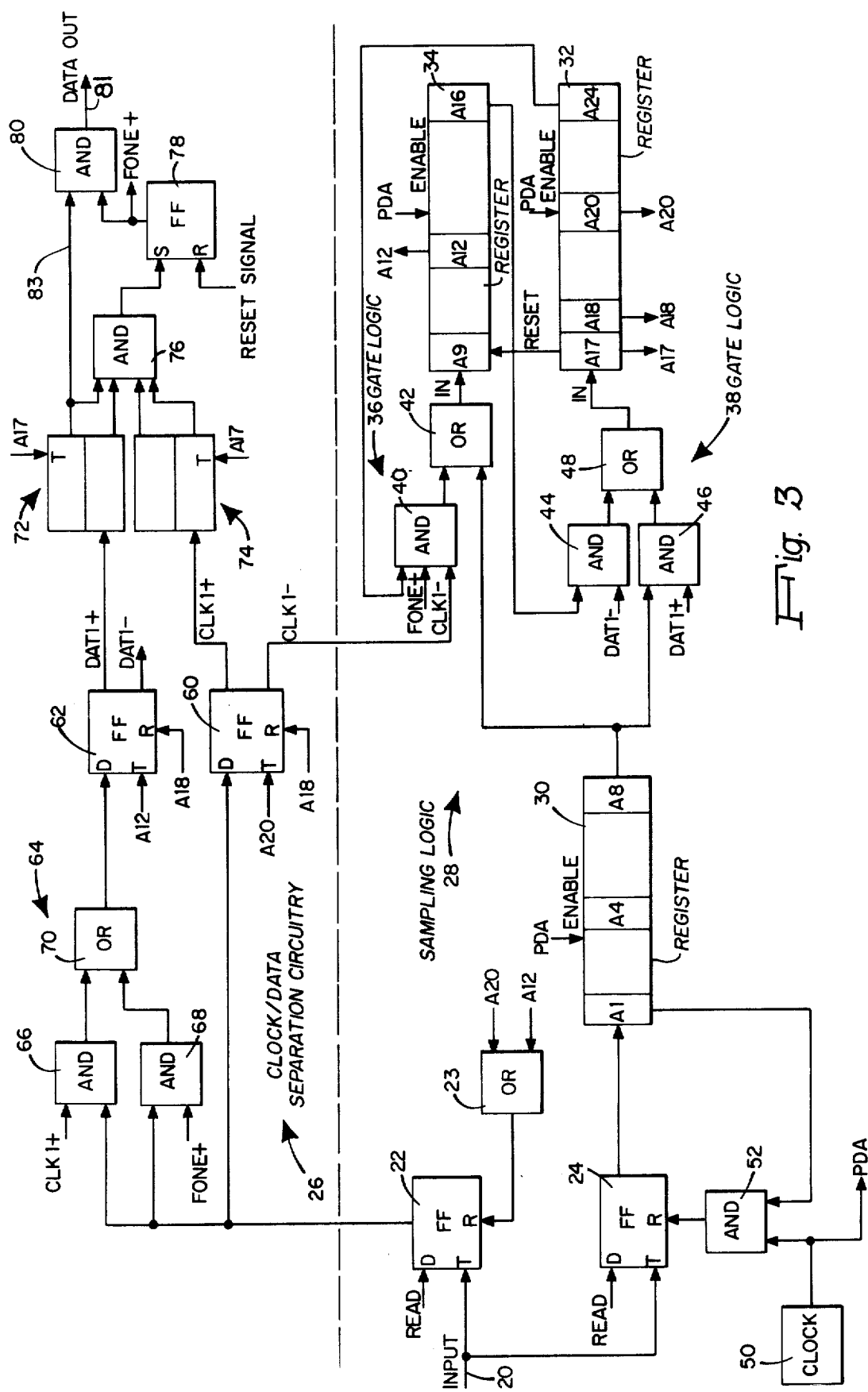
FIG. 3 illustrates a logic diagram of the apparatus of the present invention.

The apparatus of the present invention is utilized to provide sampling and separation of clock and data information of information recorded by the techniques generally referred to as double transition recording. The apparatus of the present invention is particularly suited for use with one type of double transition recording which is commonly referred to as double frequency recording. In double frequency recording, clock bits and data bits alternate in a stream of such bits. The presence of a data bit is representative of a first binary number whereas the absence of a data bit is representative of a second binary number. The presence of a data bit or clock bit is indicated by a transition, either positive or negative going, as shall be discussed with respect to FIG. 2. The clock bits are usually present in the stream of information bits.

FIG. 1 illustrates a typical data stream to be sampled and recovered. Typically there is included a gap followed by an address mark field which is in turn followed by a data field. The gap is of sufficient length to provide synchronization in the system as shall be discussed hereinafter, whereas the address mark field and data field may be of any length. The address mark identifies the record which includes the data in the data field. As indicated hereinbefore, the clock bit is usually present, that is it is usually a binary one. Except when there are error conditions as for example where a bit may be dropped the gap and data field always include binary one clock bits. In the address mark field, however, a binary zero clock bit is provided for the purpose of providing a unique address code of clock bits as well as data bits. The representative waveforms of the stream of information bits as shown in FIG. 1 is generally represented in FIG. 2. As shown for the data bits, such data bits are in the binary one state when there is a positive or negative going transition and are in the binary zero state when there is no transition as can be seen near the middle of the waveform. The clock bits follow the same pattern, that is such clock bits are a binary one if there is a transition and a binary zero if there is no transition as can be seen at the end of such waveform. The stream of bits as illustrated in the top waveform of FIG. 2 is converted by well known logic to pulses as can be seen in the bottom waveform of FIG. 2 which pulses are generated each time there is either a negative or a positive going transition. Such pulses are provided to the input of the logic of FIG. 3.

Now with reference to FIG. 3, a detailed description of the apparatus of the invention shall be provided. The input from the media storing such binary information is received on line 20. Such input on line 20 is received by two latching flip-flops 22 and 24. Flip-flop 22 provides an input to the data/clock separation circuitry 26 which is shown generally for the most part above the horizontal dotted line in FIG. 3. Flip-flop 24 provides an input to the data/clock sampling circuitry 28 which is shown on the lower right side below the horizontal dotted line in FIG. 3. Sampling logic 28 includes in one embodiment three shift registers 30, 32 and 34 each shown to be eight positions or time slices in length, as represented by flip-flops therein. Shift register 30 is coupled via gate logic 36 and gate logic 38 to the inputs of shift registers 32 and 34. Gate logic 36 includes AND gate 40 and OR gate 42 whereas gate logic 38 includes AND gates 44 and 46 as well as OR gate 48. As can be seen and as shall be more specifically described hereinafter, the presence of a data or clock bit in preselected positions of such registers will enable various operations. The shift registers 30, 34 and 32, respectively are enabled at a rate which in one embodiment may be eight times the highest frequency of the nominal flux transitions of the sampled media. Clock 50 provides the PDA signal to such registers as well as AND gate 52 for purposes of resetting flip-flop 24 as shall be described.

The clock/data separation circuitry 26 receives its input from flip-flop 22 and includes basically a clock sampling flip-flop 60 and a data sampling flip-flop 62. Flip-flop 60 is directly coupled by its input to the output of flip-flop 22 whereas flip-flop 62 receives such output from flip-flop 22 via gate logic 64 which includes AND gates 66 and 68 and OR gate 70. The DAT1+, DAT1− and CLK1− signals are provided for controlling the operation of the separation circuitry 28 and the DAT1+ and CLK1+ signals are coupled to the inputs respectively of two stage shift registers 72 and 74. The configuration of such shift registers 72 and 74 as well as AND gate 76 which is coupled to their outputs is based upon the configuration of the recorded data, i.e., the beginning of the address mark field includes four ones. Thus, all the binary ones in the four locations of shift registers 72 and 74 in combination will provide an enabling signal via AND gate 76 to set flip-flop 78 which then partially enables AND gate 80 to recover address and data information. Registers 72 and 74 are coupled to receive and shift the contents thereof by receipt of the A17 signal at the T inputs thereof.

The path for receiving the transmissions via latch flip-flop 24 and in the sampling logic 28 is shown for different data/clock bit combinations in FIGS. 4 through 7 which shall be discussed with reference to FIG. 3 and are shown for purposes of simplifying the explanation of the present invention. Assuming a clock transmission is received from input line 20, this will be latched via the toggle input of flip-flops 22 and 24 by the presence of a READ signal at the inputs thereof, which READ signal is present during the data recovery operations provided by the apparatus of the present invention. The clock transition (indicative of a binary one clock bit) will be provided at the input of register 30 and will be shifted therethrough in response to the PDA signal. The presence of such clock transition or data transition in position A1 of register 30 will fully enable AND gate 52 which is enabled at its other input by the PDA signal to reset flip-flop 24 so that there will be no further transitions provided to the input of register 30 until another transition is received on input line 20. This initial clock transition is shifted through the stages of register 30 at the PDA rate which may be set to be at least eight times the frequency of the incoming transitions on line 20, that is the frequency represented by the period between adjacent clock and data transitions. Although this frequency of the clock 50 may be lower, such configuration for purposes of recovering such data would not be as suitable as the frequency just indicated. A greater frequency in the PDA rate would provide improved sampling but with diminishing returns with respect to the accuracy of such sampling.

At the same time that flip-flop 24 provides such clock transition to the input of register 30, flip-flop 22 provides such clock transition at the input of flip-flop 60 as well as to the inputs of logic 64. However, neither logic 64 nor flip-flop 60 will latch such clock transition until the signals as indicated are present. As shall be seen, the clock transition will remain latched in flip-flop 22 until time A20, i.e., until a transition has been received in position A20 of register 32.

Thus, the clock transition will be shifted after eight PDA pulses to the output of register 30 and will be provided to one input of OR gate 42 as well as one input of AND gate 46. Assuming that flip-flop 62 has not been set and accordingly the signal DAT1+ is not present at the other input of AND gate 46, this clock transition will not be received by register 32 but will propagate through OR gate 42 and into first position A9 of shift register 34. When the clock transition is received in position A12 of register 34, this will cause flip-flop 22 to be reset by means of OR gate 23. Thus, the initial clock transition will not be latched in the flip-flop 22 and accordingly such clock transition will not have any effect on the data/clock separation logic 26. Such transition will continue to propagate through register 34 and to register 32 from AND gate 44 because the DAT1− signal is present. This is because flip-flop 62 had not received a signal at its D input since neither the CLK1+ nor the FONE+ signals have been generated, i.e., have become a binary one. Accordingly, such transition via OR gate 48 will propagate through position A17 through A24 and will be dumped out, i.e., will cease to exist, unless in fact AND gate 40 had been enabled.

Thus, it can be seen that the clock transition just described has no effect on the circuitry except to initialize such apparatus of FIG. 3 so as to, after the receipt of two or three further transitions, enable the proper operation thereof. Thus, it will be seen that such apparatus of FIG. 3 is self-initializing after receipt of only two or three transitions.

At the same time that the above-described clock transition is received in position A9 of register 34, another transition, i.e., a data transition may have been received in position A1 of register 30. This will be a typical situation when in fact the address mark field or data field is being received by the apparatus of the invention, such operation to be described hereinafter. Assuming that there is no transition, i.e., that the data bit is a binary zero, as can be seen in this second position in the gap field of FIG. 1 then there will be no further transition being propagated through the shift registers except for the initial clock transition which as indicated hereinbefore was, at the time of the possible receipt of a further transition in position A1, in position A9 of shift register 34. The next possible transition which may be received on input line 20 will be the time that the initial clock transition is received at the input position A17 of register 32, the gate delay for this purpose being of no significance. Assuming that the clock is a binary one and accordingly a transition is received by flip-flop 24, then such second clock transition will be latched into flip-flops 22 and 24. It will be received in position A1 of register 30 at the same time that the first or initial clock transition was received in position A17. If there had been a clock pulse or transition stored in sampling flip-flop 60, then it would have been provided to the first stage of the two stage shift register 74 because of the toggling provided by the signal A17. When such first clock transition is received in position A18 of register 32, both flip-flops 60 and 62 are reset. When such first clock transition is received in position A20, then via AND gate 52, flip-flop 24 is also reset. In addition, prior to signal A20 resetting flip-flop 22, basically because of the delay introduced by OR gate 23, the information content stored in flip-flop 22 will be provided to sampling flip-flop 60 via the D input thereof by the toggling thereof by signal A20.

Thus, since the second clock transition has been latched in flip-flop 22 prior to the resetting thereof, then at the time signal A20 is received at the toggle input of flip-flop 60, it will become effectively set so that the CLK1+ signal is presented at the output thereof as a binary one. Thus, the conditions are now i.e., at the time the first clock transition is received in position A20 and the second clock transition is in position A4, that both flip-flops 22 and 24 are reset as is flip-flop 62, and flip-flop 60 is set thereby producing the CLK1+ signal.

In accordance with the stream of bits shown in FIG. 1, this will mean that the next signal received on input line 20 is in fact a data binary zero. Accordingly flip-flops 22 and 24 will remain in the same reset state, and the second clock transition will effectively propagate through shift register 34 and will be in position A12 thereof at the time that the next possible transition was in position A4 of register 30. Since flip-flop 22 is effectively reset, then flip-flop 62 will not at time A12 change its state from the reset state, and accordingly the DAT1− signal will still be presented as a binary one. Accordingly, the second clock transition continues to shift through register 34 until received at the first position A17 of register 32. At this time, the CLK1+ signal will be toggled into the first stage of register 74 and accordingly one output thereof will be a binary one to the bottom input of AND gate 76. All other inputs will still be a binary zero, and accordingly AND gate 76 will not be enabled. When such second clock transition is in position A17, position A9 will be reset and when in position A18, flip-flops 60 and 62 will be reset. At the time that the second clock transition was in position A17, the third clock transition may be assumed to be in position A1. Accordingly flip-flops 22 and 24 will be toggled so that the outputs thereof will be a binary one, indicative that information having a binary one state, either a clock transition or a data transition, has been latched therein. Accordingly, when the second clock transition is in position A20, and the third clock transition is in position A4, clock flip-flop 60 will be toggled. As shall be seen, this signal will be shifted into the first stage of the two stage shift register 74 with the binary one signal already contained in the input stage thereof shifted to the second stage so that both stages of register 74 present binary one outputs to the bottom two inputs of AND gate 76. As can be seen therefore, such shifting occurs in register 74 when the third clock transition is in position A17 of register 32. It can be seen as indicated hereinbefore that when a transition is in position A17, that the contents of position 49 in registers 34 are reset as shall be discussed hereinafter. As can also be seen, flip-flop 62 can never receive a clock transition for sampling, it being coupled to receive only data transitions. This is because a signal presented when a transition is in position A12 or A20 is coupled via OR gate 23 to reset flip-flop 22 before the transition in register 30 is received in position A12 at which time flip-flop 62 would have been toggled to store the contents of flip-flop 22. Thus, with flip-flop 22 reset at the time such transition is in position A12, the clock transition is not sampled in flip-flop 62.

Thus with binary ones in both positions of register 74, binary ones will continue to be shifted therein so that such condition remains in the bottom two inputs of AND gate 76. It will be seen that once flip-flop 78 is set, the apparatus is initialized to recover useable data and that the binary state presented by register 74 to AND gate 76 is of no further concern.

Following this gap area which may be any number of clock pulses in length but as has been seen may be as little as three clock and data bits in length, the address mark field will be detected. Such address mark field will be recognized by the fact that the first four bits, i.e., the first and second clock and data bits respectively will be represented by transition, i.e., binary ones. Following such four consecutive binary ones, the address is then received and may be any combination of data bits. The operation of the apparatus of FIG. 3 will now be discussed more particularly with respect to that operation when the address mark is received. At the time when the last clock transition in the gap is in position A17, the first clock transition of the address mark will typically be present in position A1. At the time when such last clock transition in the gap is in the position A20, flip-flop 60 will be set. Flip-flop 62 will be set when the first clock transition in the address mark is in position A12 and the first data transition in the address mark is in position A4. The first data transition in the address mark will be received in all cases by register 34 in position A9 thereof via OR gate 42. However, because of the fact that flip-flop 62 is now set and therefore the DAT1+ signal is a binary one, AND gate 46 will be fully enabled to pass the same transition received by position A9 via OR gate 48 into position A17 of register 32 which will thereby reset the pulse in position A9. Accordingly, the first clock transition or pulse in register 34 will not be received by register 32 because the DAT1− signal is not a binary one and therefor AND gate 44 is not enabled. Accordingly, when the first data transition is in position A17, this will cause registers 72 and 74 to receive binary ones in both positions thereof because both flip-flops 60 and 62 have been set. When such first data transition is received in position A18, both flip-flops 60 and 62 will be reset. Flip-flop 60 is again set when the first data transition is in position A20 and the second clock transition is in position A4. Following this, when the second clock transition is in position A12, and the second data transition is in position A4, flip-flop 62 will again be set. With flip-flop 62 set, the above noted operation for the second data transition is repeated. That is to say, the second data transition is received by register 32 which causes the reset of such transition or pulse in position A9 and accordingly when such second data transition is in position A17, it being noted that the second clock transition was inhibited from receipt by register 32 by means of AND gate 44, at such time, registers 72 and 74 are again shifted so that each of the inputs thereof includes a binary one state. At this time, AND gate 76 is fully enabled, thereby setting flip-flop 78 to produce FONE+ signal in the binary one state so as to enable AND gate 80 to pass any data received on line 83 from the second stage of register 72. After flip-flop 78 has been set, it remains set independent of the binary state of any of the signals received by AND gate 76. Accordingly it does not matter what state, for example, the CLK1+ signal is in. It is noted that the flip-flop 78 may be reset, for example, in response to an error condition.

Once flip-flop 78 has been set, it is noted that AND gate 40 is enabled to receive the output of position A24 of register 32 if the CLK1− signal is a binary one, that is to say, if flip-flop 60 is in the reset state. In the address mark, once the four binary one signals are sampled for the first pair of clock and data transitions, the next indication is a clock zero, i.e. of the absence of a clock transition, inserted only in the address mark field or under an error condition. The clock zero is placed in the address mark for the purpose of providing a unique pattern of clock and data bits which may be unalterable by computer program, at least as to the clock zero bits, in a system wherein only hardware logic is capable of causing clock zeros to be written.

Continuing with the description of the operation of the apparatus of FIG. 3 the second data transition is received in position A20 at which time the lack of a clock transition, i.e., the clock bit equals a binary zero, is indicated in position A4. Following this and because the flip flop 60 had been reset when the second data transition was in position A18 and remains reset because no clock transition has been received, the second data transition is received from the output of position A24 by position A9 via AND gate 40 and OR gate 42.

Thus, when the second data transition is in position A9, typically, a third data transition will be in position A1, which transition in this case, by way of example with reference to FIG. 1 is binary one. When a second data transition is in position A12 and the third data transition is position A4, flip-flop 62 will be set. When the second data transition is received in position A17, then register 72 will be toggled or shifted so as to provide the data output on line 81. In addition, at this time, position A9 of register 34 is reset and accordingly the second data transition is in position A17 and the third data transition has been eliminated or reset from position A9. Also, the second clock bit which is a binary zero in the address mark field is indicated in position A1, or put another way a transition is not indicated in position A1. The second data transition again loops back to position A9 and when recieved in position A12, the fourth data transition of the address mark is in position A4. Flip-flop 62 is then set and when the second data transition is in position A17 the shift or toggle operation of register 72 again takes place thereby providing the data output on line 81. When the second data transition is received in position A20, assuming that there is a clock transition in position A4, then flip-flop 60 will be set and when such clock transition is in position A12, and assuming the data transition is in position A4, flip-flop 62 will be set. At the time that such clock transition is in position A17, then both registers 72 and 74 will be shifted thereby providing via register 72 data output on line 81. The above noted operations continue dependent upon whether or not the data bit is a binary one or a binary zero, such indication received at the data output on line 81. Dependent upon whether the clock bit is a binary one or a binary zero, then the operation with respect to the loop provided from the output of position A24 via AND gate 40 is provided or in the case where the clock bit is a binary one, then register 32 or register 34 is utilized dependent upon the state of the data sampling flip-flop 62. That is, dependent upon the state of flip-flop 62 either AND gate 44 or 46 will be enabled. If AND gate 46 is enabled, then register 32 will be used, it being noted that a transition is always received by position A9 of register 34 but that if also received in position A17 of register 32, then the transition in position A9 will be reset or cleared.

Now referring to FIGS. 4 through 7, the flow of the transitions is depicted in simplified illustrations of the apparatus of FIG. 3 under certain data sequence conditions. Detailed information as to the setting and enabling flip-flops and the enabling of gates may be seen with reference to the above discussion. With reference to FIG. 4, this illustrates the path taken by a data transition (data one) followed by a clock transition (clock one) and is shown to flow via flip-flop 24 through gate logic 38 and then through register 32 and then is dumped out of register 32 and serves no further function. FIG. 4 also illustrates, as a second example, the path of a data one which is followed by a clock zero (lack of a clock transition) if the flip-flop 78 has not been set. Thus the path of FIG. 4 is followed in the first example because the data one is detected by sampling flip-flop 62 which accordingly causes the DAT1+ signal to be a binary one enabling AND gate 46. The data one is dropped out of register 32 and is not received by register 38 for the first example noted above because the succeeding bit is a binary one and accordingly the CLK1− signal is a binary zero because of the fact that the clock sampling flip-flop 60 had been set at the time the data one was in position A20. With respect to the second example noted above, the same path of FIG. 4 is followed because of the fact that the DAT1+ signal is a binary one and the flip-flop 78 had not been set. This thereby disables AND gate 40.

With respect to FIG. 5, this shows the data path when a clock one is followed by a data one the path being through elements 24, 30, 36 and 34 in that order. It should first be noted that a clock one, as well as a data one, will always be received by position A9 of register 34 regardless of other signal conditions but will be reset in position A9 if also simultaneously received in position A17. The DAT1+ signal is a binary zero, however, because flip-flop 62 is reset at time A18. Thus, the clock one is shifted through the register 34 and out if such clock one is followed by data one. If such clock one is followed by a data zero as depicted by the flow in FIG. 6, then and because the flip-flop 60 has not been set by such data zero, the DAT1− signal is a binary one and AND gate 44 is enabled to receive such clock one from position A16 and is transferred into position A17 of register 32. Such clock one is then shifted out of register 32. In the case as depicted in FIG. 5 where the clock one was followed by a data one, the path from position A16 to A17 was not followed by such clock one because in fact the data one caused flip-flop 62 to be set. Thus the entire flow path of FIG. 6 is through elements 24, 30, 36, 34, 38 and 32 in that order.

With reference to FIG. 7, this depicts the flow of a data one when flip-flop 78 has been set and when such data one is followed by a clock zero, the flow being through elements 24, 30, 38, 32, 36 and 34 in that order. Thus feedback path provided from position A24 to position A9 is provided because the FONE+ signal is a binary one since flip-flop 78 is set, and since the sampled clock zero causes flip-flop 60 not to be set and thereby causes the CLK1− signal to be a binary one. This fully enables AND gate 40 so that such data one is received from position A24 into the input of position A9 of register 34. Thus, as shown by FIGS. 6 and 7, the path from the output of register 34 to the input of register 32 is provided so that the proper timing signals will be provided when a clock one is followed by a data zero. This enables a transition to be received in position A20 so as to be able to provide sampling of the clock transition via flip-flop 60. If this path was not provided, then because there was no data transition, i.e., it was a data zero, such data zero would not be present as a transition or pulse in position A20 and accordingly the next possible clock transition which would have been in position A4 of register 30 could not have been sampled. With respect to the path provided from the output of register 32 to the input register 34, the function thereof is to compensate for the fact that a clock zero has followed a data one by enabling such data one which is not followed by a clock one, to be received in position A12 and thereby enable the sampling of the next data one via flip-flop 62. Otherwise, the lack of such clock one as indicated by a clock zero, would thereby cause no transition to be in position A12 in order to sample the next data transition.

As has been seen the apparatus of the present invention is capable of sampling data transitions or the lack thereof and clock transitions or the lack thereof and separating such clock and data transitions. The separation of such clock and data information is provided by means of logic 26 and the sampling is provided by means of logic 28. In further explanation of the present invention, it can be seen that such sampling will take place even though such data or clock transitions are earlier or later than that which would be provided under ideal conditions. For example, with reference to the sampling of a data transition, in the ideal case, when a clock transition, i.e., a clock one, is in position A12 the data transition is in position A4. Flip-flop 22 remains set by such transition in position A4 during the entire period of time that such transition is passing through all of the positions A1 through A8 of register 30. Flip-flop 22 will not be reset until a gate delay after a transition is received in position A12 or in position A20. Thus such data transition when in position A4 under ideal circumstances will be sampled by a signal from position A12 of register 34 to toggled flip-flop 62 thereby sampling the data transition. If the data transition is late, that is to say when the clock transition is in position A12 and the data transition for example has just set flip-flop 22 or for example has just been received in position A1 nevertheless, such data transition although late by half the width of the register 30, will be sampled. If such data transition were early, i.e., if the data transition, for example, was in position A8 of register 30 when the clock transition which proceeded it is in position A12, such data transition will nevertheless be sampled. As indicated herein before, the width of register 30 is equal to the time between successive clock and data transitions. Another way of saying this is that such timing with respect to the window provided by register 30 is equal to one half of the data cell size where the data cell is equal to the time between two successive data transitions. Thus the tolerance of the present system is seen to be 25 percent of the width of a complete data cell.

The present invention has been described with respect to a specific embodiment which may be altered without departing from the scope of the present invention by for example changing the various logic elements and timing arrangement. For example, more or less than eight stages in each of such registers 30, 32 and 34 could be provided without departing from the scope of the present invention. Further, as can be seen, register 34 may have been eliminated by simply utilizing sufficient gating logic to provide the function in register 32 which would have otherwise been provided in register 34. This is possible because it has been seen with respect to for example FIGS. 4 through 7 that in fact only the register 32 or 34 need be used at one particular time. For example, in FIG. 4, the data one transition is always shown to pass through register 32, whereas in FIG. 5 the clock one is shown to pass through register 34. This is also the case for the flow of FIGS. 6 and 7 which in addition show the additional flow to compensate for the clock or data zero. It can thus be seen that other changes may be made to the embodiment shown with respect to the present invention without departing from the scope thereof.

Having described the invention, what is claimed as new and novel and for which it is desired to secure Letters Patent is:

1. Apparatus for sampling data from an information stream of clock and data bits, said information stream having a first frequency, said apparatus comprising:
A. a first delay element;
B. a second delay element;
C. wherein both said first and second delay elements have an input and an output;

D. means for coupling the output of said first element to the input of said second element;
E. means for receiving said stream of bits at the input of said first element;
F. means for generating a stream of system clock signals having a frequency which is greater than said first frequency;
G. means, included in said first and second delay elements and responsive to said clock signals, for enabling said clock and data bits of said information stream to be passed through said first and second elements;
H. wherein said frequency of said clock signals is set so that no more than one bit, regardless of kind, is passing through either of said first or second elements at any given time;
I. means, included in said second element, for indicating that one of said bits is substantially midway in its passing through said second element; and
J. means, responsive to said means for indicating, for sampling whether another one of said bits has been received by said first element.

2. Apparatus as in claim 1 further comprising:
A. a first bistable element, included in said means for receiving, for storing each bit received by said means for receiving; and
B. means, responsive to the receipt of a said bit by said first delay element, for clearing the bit stored in said first bistable element.

3. Apparatus as in claim 1 further comprising:
A. first bistable element for receiving, in parallel with said means for receiving, said stream of bits; and
B. means for clearing a said bit received by said first bistable element after said means for sampling has sampled whether a said another one of said bits has been received by said first element.

4. Apparatus as in claim 1 further comprising:
A. A third delay element having an input and an output;
B. first logic means for coupling said input of said third delay element for receipt of bits from either the output of said first element or from the output of said second element;
C. means, included in said third element and responsive to said clock signals for enabling said bits of said stream to be passed through said third element at the frequency of said clock signals;
D. second means, included in said third element, for indicating that one of said bits is substantially midway in its passing through said third element; and wherein
E. said means for sampling is responsive to said second means for indicating so as to sample whether said another one of said bits has been received by said first element.

5. Apparatus as in claim 4 further comprising second logic means, said first logic means included in said second logic means, for inhibiting the simultaneous passing of a said bit from the input to the output of said second element and from the input to the output of said third element.

6. Apparatus as in claim 5 wherein said second logic means further comprises:
A. means for generating a clear signal upon receipt of a said bit by said second element; and
B. means, included in said third element and responsive to said clear signal, for clearing a said bit simultaneously received by said third element from being passed any further in said third element.

7. Apparatus as in claim 4 further comprising:
A. second logic means for coupling said input of said second element for receipt of bits from either the output of said first element or the output of said third element; and wherein
B. said data and clock bits have either a first binary state or a second binary state, and wherein said first and second logic means are responsive to said first and second binary states of said bits so as to enable said bits to pass through said first, second and third elements as follows
  1. a said data bit of a said first binary state passes through said first element and then through said second element if followed by a clock bit having either a said first binary state or a said second binary state, and
  2. a said clock bit of a said first binary state passes through said first element and then through said third element if followed by a data bit having either a said first binary state or a said second binary state.

8. Apparatus as in claim 7 further comprising:
A. means for detecting that the data bits to be next received includes useable information, said means for detecting generating a synchronization signal in response thereto; and wherein said first and second logic means are further responsive to said first and second binary states of said bits so as to enable said bits to pass through said first, second and third elements as follows
  1. a said data bit of a said first binary state passes through said first element and then through said second element and then through said third element if followed by a said clock bit having a second binary state and if said synchronization signal has been generated by said means for detecting, and
  2. a said clock bit of a said first binary state passes through said first element and then through said third element and then through said second element if followed by a data bit having a second binary state.

9. Apparatus as in claim 1 wherein said first and second delay elements each includes shift registers, said shift registers comprised of a plurality of bistable means each for temporarily storing a said bit.

10. Apparatus as in claim 9 wherein the frequency of said system clock signals is N times said first frequency, where N is a positive integer, and wherein the number of said bistable means in said first delay element is also equal to N.

11. Apparatus as in claim 10 where the number of said bistable means in said first and second delay elements is the same.

12. Apparatus as in claim 10 wherein N equals eight.

13. Apparatus for recovering data from an information stream of clock bits and data bits, hereinafter collectively referred to as bits, said apparatus comprising:
A. first bistable means coupled for receiving said bits;
B. first delay means coupled for receiving said bits;
C. second delay means coupled for receiving said bits from said first delay means, said second delay means having a midway point, said first and second delay means each having an input and an output;
D. bit sampling means for sampling the state of said bits;

E. first logic means for coupling the output of said first delay means to the input of said second delay means;
F. means for enabling said bits to pass through said first and second delay means at a predetermined frequency;
G. means for generating a sample enable signal when one of said bits is substantially near said midway point between the input and the output of said second delay means;
H. wherein said predetermined frequency is selected so that a one of said bits next succeeding a preceding one of said bits which has passed to said midway point is received by said first bistable means no later than the time said preceding one of said bits has passed to said midway point; and
I. means, responsive to said sample enable signal, for enabling said bit sampling means to receive the said one of said bits next succeeding said preceding one of said bits from said first bistable means.

14. Apparatus as in claim 13 further comprising means for clearing said first bistable means of any information content following the receipt of said bit by said bit sampling means in order to enable said first bistable means for the receipt of another said bit.

15. Apparatus as in claim 13 further comprising:
A. means coupled with said bit sampling means, for detecting the receipt of a predetermined pattern of said clock bits and said data bits and for generating a synchronization signal in response thereto; and
B. means, responsive to said synchronization signal, for enabling said data bits received by said bit sampling means to be transferred as useable information.

16. Apparatus as in claim 13 wherein said bits have either a first or second binary state and said first logic means includes means for enabling a said bit to pass from said first delay means to said second delay means if the previous data bit sampled by said bit sampling means was a said first binary state.

17. Apparatus for recovering data from an information stream of clock and data bits, said apparatus comprising;
A. first, second and third delay means, each having an input and an output and a midpoint, the input of said first delay means coupled for receiving said bits;
B. first gate means coupled to provide a path for said bits to the input of said second delay means from either the output of said first delay means or the output of said third delay means;
C. second gate means coupled to provide a path to the input of said third delay means from either the output of said first delay means or the output of said second delay means;
D. means for generating clock pulses having a control frequency which is N times that rate of receipt of said bits, N being a positive number, said control frequency selected so that no more than one of said bits is passing through said first delay means at any given time;
E. means, responsive to said clock pulses and included in each of said delay means, for enabling said clock and data bits to be passed through enabled ones of said delay means;
F. first means, included in said second delay means, for generating a clock bit sample signal each time a bit is received at substantially said midpoint between said input and output of said second delay means;
G. second means, included in said third delay means, for generating a data bit sample signal each time a bit is received substantially at said midpoint between said input and output of said third delay means;
H. first bistable means for receiving said bits; and
I. means, responsive to said first and second means for generating, for sampling said bits received by said first bistable means.

18. Apparatus as in Claim 17 further comprising logic means, coupled with said means for sampling, for enabling said data bits so sampled to be transferred.

19. Apparatus as in claim 18 wherein said logic means comprises:
A. means for detecting that a predetermined pattern of said bits has been sampled by said means for sampling; and
B. means responsive to the receipt of said pattern by said means for detecting, for enabling said data bits to be transferred to said further logic independent of any further pattern of said clock bits sampled by said means for sampling.

* * * * *